G. H. COLE.
WASHER.
APPLICATION FILED APR. 1, 1920.
1,386,092.
Patented Aug. 2, 1921.
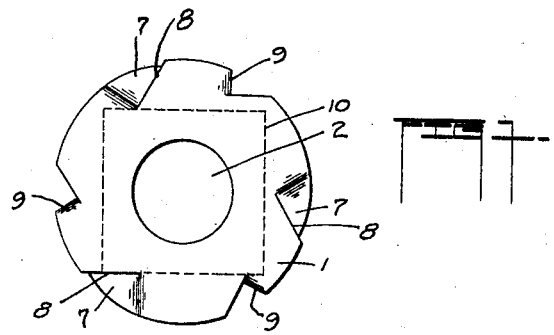
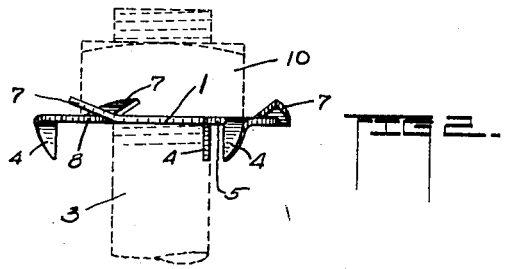
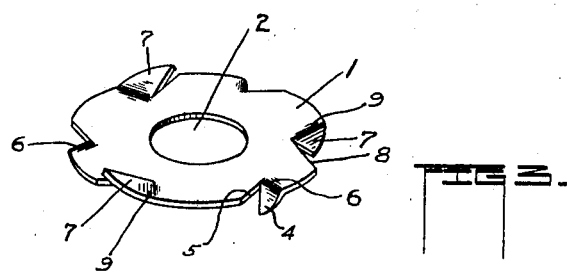
INVENTOR
George H. Cole
BY
ATT'Y.

UNITED STATES PATENT OFFICE.

GEORGE H. COLE, OF WENONA, ILLINOIS.

WASHER.

1,386,092.   Specification of Letters Patent.   Patented Aug. 2, 1921.

Application filed April 1, 1920. Serial No. 370,612.

*To all whom it may concern:*

Be it known that I, GEORGE H. COLE, a citizen of the United States, a resident of Wenona, in the county of Marshall and State of Illinois, have invented new and useful Improvements in Washers, of which the following is a specification.

This invention has reference to washers, and relates particularly to a washer which is so constructed that it may be firmly affixed to the part through which the securing bolt is passed, and provided with springs, clips or tangs stamped up out of the metal, each capable of being depressed as the head of the bolt or a nut is turned to permit the same to pass over such clips or tangs, and which serve to engage the corners of the head of the bolt or nut for locking the same against loosening.

That the invention may be more fully understood, reference is had to the accompanying drawings forming a part of the description, in which:

Figure 1 is a plan view of my washer, and a bolt head or nut shown in dotted lines in its relation to the locking clips or tangs;

Fig. 2 is an elevation of Fig. 1; and

Fig. 3 is a perspective view of the washer.

Like characters of reference denote corresponding parts throughout the figures.

The washer, designated 1, is preferably made of sheet metal stamped into the desired form and punched with a central opening 2, through which a bolt 3, shown in dotted lines, may be passed.

This washer is preferably circular in formation, and in the body contiguous to or coincidental with the peripheral edge, there is punched out a plurality of preferably tapered depending tangs 4, said tangs being formed by making an incision 5 in the body of the washer extending inwardly obliquely from the peripheral edge, and bent down along the lines 6, approximately radially disposed in the body of the washer. These tangs 4, when the washer is placed in position on the body to which the bolt is intended to be secured, are driven into the body for immovably holding the washer in position as the bolt is secured in place.

The washer is further provided with a plurality of clips or tangs 7 stamped out of the body of the washer contiguous to or coincident with the periphery of the washer. These tangs are formed by incisions 8, made in the body of the washer extending obliquely from the periphery, and bent upwardly along approximately radial lines 9. It is to be observed that the tangs 4 for securing the washer in place, are bent downwardly and preferably at right angles to the surface of the washer, whereas the tangs or clips 7 are bent upwardly so as to assume an inclined position relatively to the surface of the washer.

In operation, the washer 1 having been secured in place with the tangs 4 entering the body, through which the bolt 3 is to be passed, the bolt is passed through the opening 2 and a nut 10 to be secured on the bolt as it is screwed thereon, the corners of the nut ride over the upwardly or outwardly inclined clips or tangs 7, depressing the same, which when released, spring back into engaging positions, shown in Fig. 3, and after the nut has been firmly secured on the bolt, it assumes the position with one or more sides of the nut bearing against the inner edges of said clips or tangs for locking the nut against displacement from the nut by reason of the jar, or through accidental displacement for any reason. To release the nut from the bolt, it is understood that the clips or tangs 7 must be depressed as the nut is turned, until it assumes a position where it will not engage with the same when it may be removed entirely from the bolt.

It will thus be observed from the foregoing disclosure and description, I have provided a simple and inexpensive washer, which functions also as a locking means for holding a nut in position on the bolt when screwed thereon.

What I claim is:—

A washer comprising a sheet metal plate having a central opening to receive a bolt, and having a plurality of depending tapered prongs stamped out of the body of the washer and extending at right angles thereto, and located contiguous to the periphery thereof, and also provided with a plurality of resilient tangs stamped out of the body of the washer contiguous to its periphery and inclined upwardly relatively to the surface thereof and adapted after depression to spring back to locking position, said last mentioned tangs being located alternately with respect to said first mentioned tangs.

In witness whereof, I have hereunto affixed my hand this 20th day of March, 1920.

GEORGE H. COLE.